US012080243B2

(12) United States Patent
Nishiyama

(10) Patent No.: US 12,080,243 B2
(45) Date of Patent: Sep. 3, 2024

(54) DISPLAY DEVICE

(71) Applicant: Sharp Kabushiki Kaisha, Sakai (JP)

(72) Inventor: Takayuki Nishiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/766,826

(22) PCT Filed: Oct. 11, 2019

(86) PCT No.: PCT/JP2019/040261
§ 371 (c)(1),
(2) Date: Apr. 6, 2022

(87) PCT Pub. No.: WO2021/070368
PCT Pub. Date: Apr. 15, 2021

(65) Prior Publication Data
US 2024/0087535 A1 Mar. 14, 2024

(51) Int. Cl.
*G09G 3/32* (2016.01)
*G09G 3/3233* (2016.01)
(Continued)

(52) U.S. Cl.
CPC ......... *G09G 3/3266* (2013.01); *G09G 3/3233* (2013.01); *G09G 3/3275* (2013.01); *G09G 2310/08* (2013.01); *G09G 2320/0257* (2013.01)

(58) Field of Classification Search
CPC ........................................................ G09G 3/32
See application file for complete search history.

(56) References Cited

U.S. PATENT DOCUMENTS

2005/0062691 A1* 3/2005 Tamura ................ G09G 3/2092 345/76
2011/0122324 A1* 5/2011 Yamashita ........... G09G 3/3233 348/739
(Continued)

FOREIGN PATENT DOCUMENTS

JP 2008-083085 A 4/2008
JP 2012-047894 A 3/2012
(Continued)

OTHER PUBLICATIONS

Official Communication issued in International Patent Application No. PCT/JP2019/040261, mailed on Dec. 24, 2019.

*Primary Examiner* — Joseph R Haley
(74) *Attorney, Agent, or Firm* — Keating & Bennett, LLP

(57) ABSTRACT

A display device includes: in a display region, a first scanning control line, a light emission control line, a data signal line, a pixel circuit provided at an intersection of the first scanning control line and the data signal line, and a light-emitting element provided for each of the pixel circuits; and in a non-display region, a first scanning control circuit and a light emission control circuit, wherein each of the pixel circuits includes a drive transistor, a write transistor, and a capacitor, the drive transistor including a first control terminal and a second control terminal positioned above and below a semiconductor layer, the light emission control circuit outputs, to the light emission control line, a light emission control signal that switches between a select state in which the drive transistor is turned on and a non-select state in which the drive transistor is turned off.

13 Claims, 16 Drawing Sheets

(51) Int. Cl.
*G09G 3/3266* (2016.01)
*G09G 3/3275* (2016.01)

(56) References Cited

U.S. PATENT DOCUMENTS

| | | | | |
|---|---|---|---|---|
| 2012/0050252 | A1 | 3/2012 | Akimoto et al. | |
| 2012/0169798 | A1 | 7/2012 | Ebisuno | |
| 2013/0050292 | A1 | 2/2013 | Mizukoshi | |
| 2017/0352313 | A1* | 12/2017 | Miyake | G09G 3/3266 |
| 2018/0151132 | A1* | 5/2018 | Lee | G09G 3/30 |

FOREIGN PATENT DOCUMENTS

| | | | |
|---|---|---|---|
| JP | 2017-219839 | A | 12/2017 |
| JP | 2018-088391 | A | 6/2018 |
| WO | 2011/125107 | A1 | 10/2011 |

* cited by examiner

DISPLAY DEVICE

TECHNICAL FIELD

The disclosure relates to a display device that displays an image and the like, and particularly relates to a reduction in the number of constituent transistors of a pixel circuit that drives a light-emitting element.

BACKGROUND ART

As described in PTL 1, there is a display device in the related art with a configuration in which a drive circuit (a pixel circuit) for a light-emitting element has a drive transistor connected to the light-emitting element in series to cause a drive current to flow to the light-emitting element using an on operation of the drive transistor, and has a light emission control transistor connected to the drive transistor in series, and the light emission control transistor performs on- and off-control using an emission control line to control a light emission time (a duty ratio) within a one-field period of the light-emitting element.

CITATION LIST

Patent Literature

PTL 1: JP 2018-88391 A

SUMMARY

Technical Problem

However, because the light emission control transistor needs to be connected to the drive transistor in series according to the technique described in PTL 1, there is a disadvantage that the number of transistors of the pixel circuit increases. Furthermore, there are other disadvantages that it is difficult to achieve high definition and a display device with a bottom-emitting structure has a lower aperture ratio.

An objective of the disclosure is to provide a display device capable of achieving high definition while reducing the number of constituent transistors of a pixel circuit.

Solution to Problem

That is, a display device according to the disclosure includes, in a display region, a first scanning control line, a light emission control line extending parallel to the first scanning control line, a data signal line intersecting the first scanning control line, a pixel circuit provided at an intersection of the first scanning control line and the data signal line, and a light-emitting element provided for each of the pixel circuits, and, in a non-display region, a first scanning control circuit configured to drive the first scanning control line and a light emission control circuit configured to drive the light emission control line, in which each of the pixel circuits includes a drive transistor, a write transistor, and a capacitor configured to hold a data signal, the drive transistor including a first control terminal and a second control terminal positioned above and below a semiconductor layer with the semiconductor layer interposed between the first and second control terminals, the drive transistor configured to cause a drive current to flow to the light-emitting element, the write transistor includes a first conduction terminal connected to the data signal line, a second conduction terminal connected to the first control terminal of the drive transistor, and a control terminal connected to the first scanning control line, the drive transistor includes the second control terminal connected to the light emission control line, and the light emission control circuit outputs, to the light emission control line, a light emission control signal that switches between a select state in which the drive transistor is turned on and a non-select state in which the drive transistor is turned off.

Advantageous Effects of Disclosure

According to the disclosure, the drive transistor with a double gate structure can be turned on and off to control a duty ratio over light emission periods of the light-emitting element, and thus high definition can be achieved while reducing the number of transistors of the pixel circuit.

DESCRIPTION OF EMBODIMENTS

A display device according to embodiments of the disclosure will be described below with reference to the drawings.

First Embodiment

Overall Configuration

Figure 1:
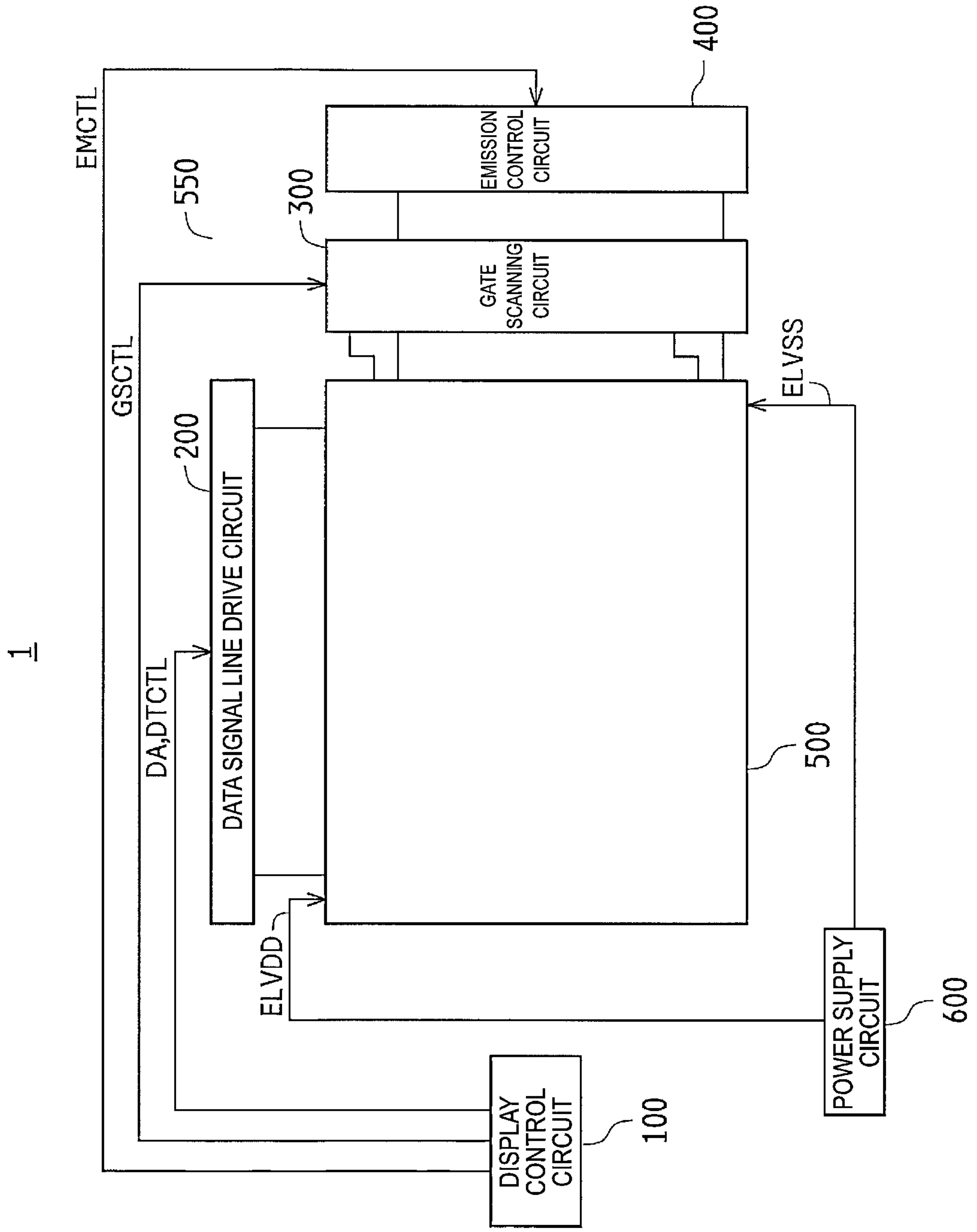
FIG. 1 is a block diagram illustrating an overall schematic configuration of a display device according to a first embodiment of the disclosure.

FIG. 1 is a block diagram illustrating an overall configuration of a display device 1 according to a first embodiment of the disclosure. The display device 1 includes a display control circuit 100, a data signal line drive circuit 200, a gate scanning circuit 300, an emission control circuit 400, and a display portion 500. The emission control circuit 400 is a drive circuit for a wiring line (an emission control line to be described below) that controls light emission of a light-emitting element provided in the display portion 500. Further, in the display device 1, a power supply circuit 600 is provided as a configuration for supplying various power supply voltages to the display portion 500.

Figure 2:
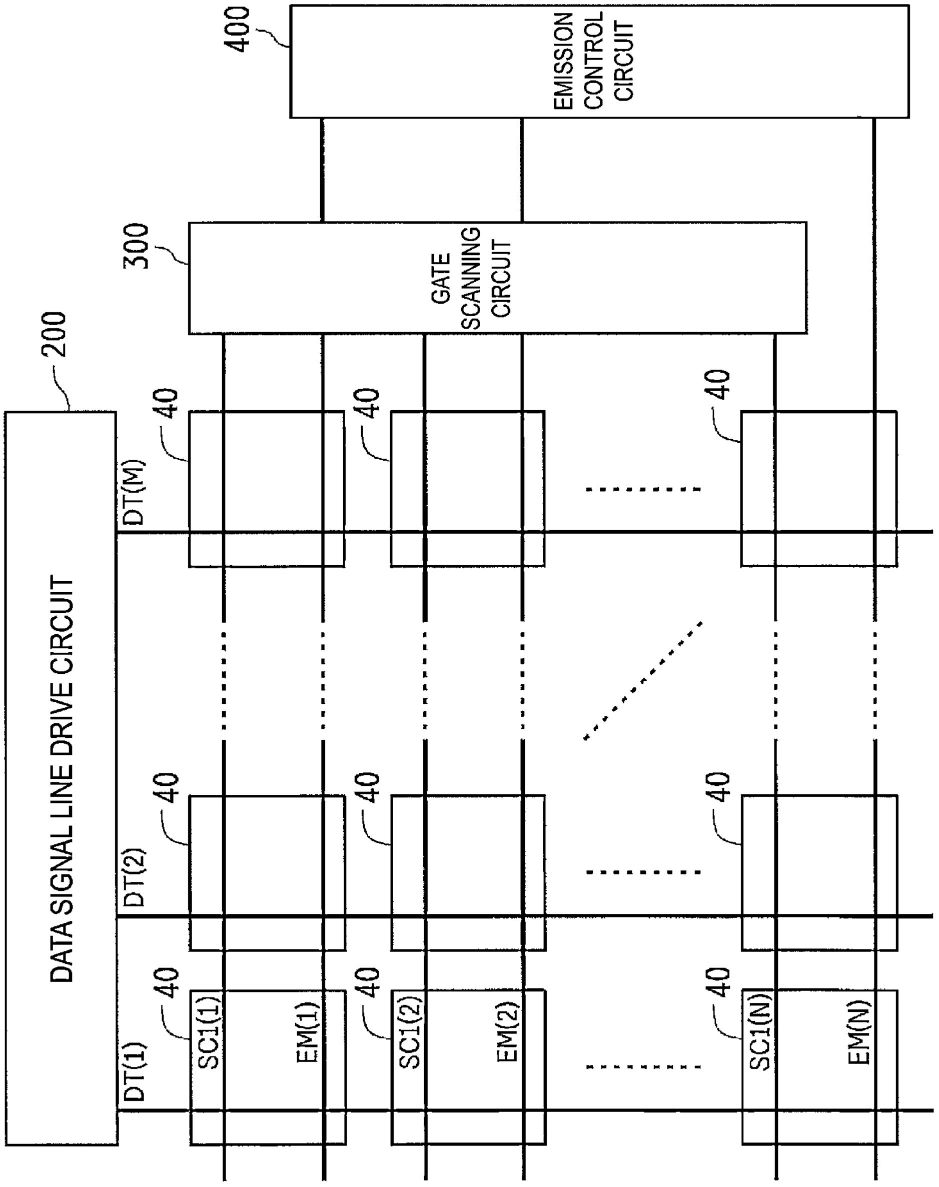
FIG. 2 is a block diagram illustrating a schematic configuration of a display portion included in the display device.

FIG. 2 is a block diagram illustrating a configuration of the display portion 500. In the drawing, the display portion 500 constitutes a display region including a large number of pixels. The display portion (display region) 500 has M data signal lines DT(1) to DT(M) extending in the longitudinal direction in the drawing and N scanning control lines (first scanning control lines) SC1(1) to SC1(N) extending in the horizontal direction in the drawing in such a manner that the data signal lines and the scanning control lines are arranged to intersect each other. Pixel circuits 40 are provided corresponding to each intersection of the data signal lines DT(1) to DT(M) and the scanning control lines SC1(1) to SC1(N). Thus, the pixel circuits 40 are arranged in a matrix shape in the display portion 500 to constitute a plurality of rows (N rows) and a plurality of columns (M columns). Furthermore, N emission control lines (light emission control lines) EM(1) to EM(N) are arranged in parallel to the N scanning control lines SC1(1) to SC1(N) in the display portion 500. In addition, although not illustrated, a high-level power supply line ELVDD for organic EL and a low-level power supply line ELVSS for organic EL are arranged in the display portion 500.

In FIG. 1, the gate scanning circuit (a first scanning control circuit) 300 is disposed on an outer periphery (a non-display region) 550 of the display portion (a display region) 500. The gate scanning circuit 300 drives the scanning control lines (first scanning control lines) SC1(1) to SC1(N) to control scan control signals (scanning control signals). Specifically, the display control circuit 100 outputs various control signals GSCTL for controlling operation of the gate scanning circuit 300 to the gate scanning circuit 300. The gate scanning circuit 300 includes N shift registers (not illustrated) inside and sequentially applies scanning control signals in a high (active) state to the N scanning control lines SC1(1) to SC1(N) for a predetermined period based on the received various control signals GSCTL as illustrated in the timing chart of FIG. 4, etc. Hereinafter, the state in which scanning control signals in the high state are applied to the scanning control lines SC1(1) to SC1(N) will be referred to as a "select state". Thus, the N scanning control lines SC1(1) to SC1(N) sequentially enter the select state for a predetermined period. When a scanning control line SC1(*j*) (1≤j≤N) is in the select state, a data signal is written in the pixel circuit 40 in the j-th row provided corresponding to the scanning control line SC1(*j*), as will be described below.

In addition, the data signal line drive circuit 200 controls data signals of the data signal lines DT(1) to DT(M). Specifically, the display control circuit 100 outputs display data DA and various control signals DTCTL for controlling operation of the data signal line drive circuit 200 to the data signal line drive circuit 200. The data signal line drive circuit 200 holds one-row (M pieces) display data DA(1) to DA(M) based on the received various control signals DTCTL, converts each piece of the one row of display data DA(1) to DA(M) into an analog voltage, and applies the display data DA(1) to DA(M) of the analog voltage as data signals to the corresponding data signal lines DT(1) to DT(M) all at once.

Furthermore, the emission control circuit (a light emission control circuit) 400 is also disposed on the outer periphery (a non-display region) 550 of the display portion (display region) 500. The emission control circuit 400 drives emission control lines (light emission control lines) EM(1) to EM(N). Specifically, the display control circuit 100 outputs various emission control signals EMCTL for controlling operation of the emission control circuit 400. The emission control circuit 400 includes N shift registers (not illustrated) inside and sequentially applies light emission control signals in a high state to the N emission control lines EM(1) to EM(N) for a predetermined period Ton based on the received emission control signals EMCTL as illustrated in the timing chart of FIG. 4, etc. Hereinafter, the state in which light emission control signals in the high state are applied to the emission control lines EM(1) to EM(N) will be referred to as a "select state". Accordingly, the emission control circuit 400 sequentially puts the N emission control lines EM(1) to EM(N) in the select state for the predetermined period Ton. When an emission control line (j) (1≤j≤N) is in the select state, the pixel circuit 40 in the j-th row provided corresponding to an emission control line EM(j) causes a drive current to flow to the corresponding light-emitting element to perform light emission operation of the light-emitting element, as will be described below.

Furthermore, the power supply circuit 600 outputs a high-level power supply voltage for organic EL and a low-level power supply voltage for organic EL to cause the voltages to be input to the high-level power supply line ELVDD for organic EL and the low-level power supply line ELVSS for organic EL.

Configuration of Pixel Circuit

Figure 3:
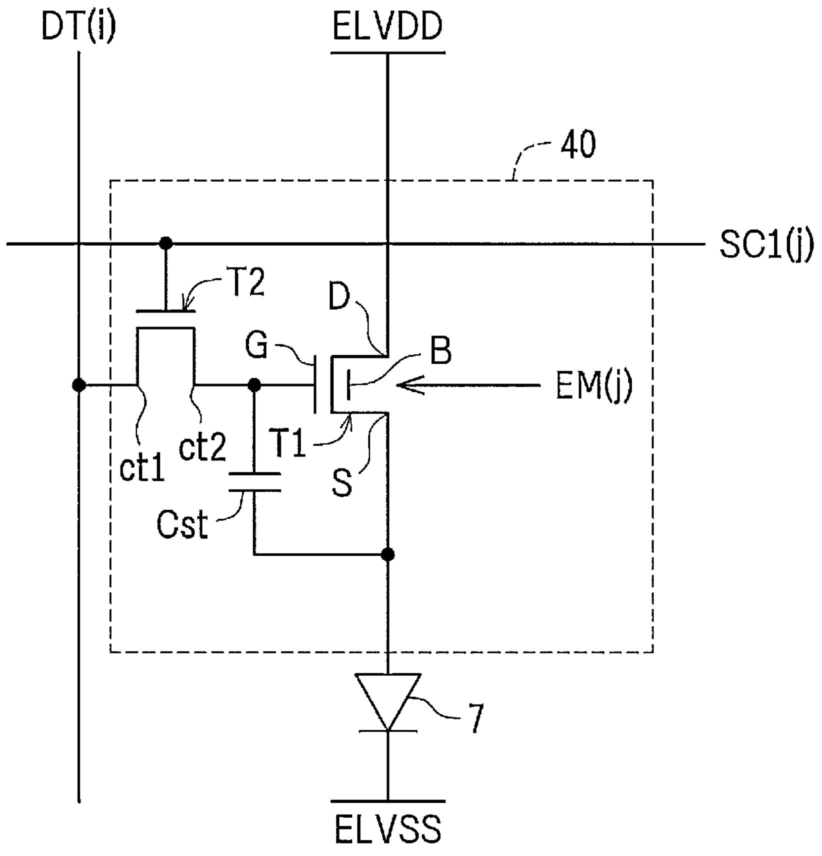
FIG. 3 is a circuit diagram illustrating a configuration of a drive circuit included in the display portion.

FIG. 3 is a circuit diagram illustrating a configuration of the pixel circuit 40. One light-emitting element 7 is connected to the pixel circuit 40, and one pixel circuit 40 and one light-emitting element 7 form one pixel. Although each light-emitting element 7 is configured as one organic EL element (Organic Electroluminescent Diode) in the present embodiment, for example, it is not limited to an organic EL element, and can be configured as any of various electro-optical elements whose luminance and transmittance are controlled due to a flowing current, such as a quantum dot light-emitting element (a Quantum dot Light Emitting Diode).

The pixel circuit 40 and the light-emitting element 7 are provided corresponding to each intersection of the M data signal lines DT(1) to DT(M) and the N scanning control lines SC1(1) to SC1(N) arranged in the display portion 500. Note that the pixel circuit 40 illustrated in FIG. 3 is described as a pixel circuit 40 corresponding to an i-th row and a j-th column (1≤i≤M and 1≤j≤N).

An internal configuration of the pixel circuit 40 is as follows. Note that, because each of the pixel circuits 40 has the same configuration, a data signal line will be denoted by DT(i), a scanning control line will be denoted by SC1(*j*), and an emission control line will be denoted by EM(j) below. The pixel circuit 40 includes two transistors T1 and T2, and one capacitor Cst. This pixel circuit is merely an example, and a plurality of other transistors and capacitors may be further provided. The transistor T1 functions as a drive transistor for driving the light-emitting element 7 and as a light emission control transistor that controls the supply of a drive current to the light-emitting element 7 to control light emission of the light-emitting element 7 as will be described in detail below. Hereinafter, the transistor T1 will be referred to as a drive transistor. In addition, the transistor T2 functions as a write transistor that writes a data signal of the data signal line DT(i) into the capacitor Cst. Although the drive transistor T1 and the write transistor T2 are configured as n-channel thin film transistors (TFTs) in the drawing, the transistors may be configured as p-channel transistors. However, in the case where the transistors are configured as p-channel transistors, a state in which a scanning control signal in a low (active) state is applied to the scanning control lines SC1(*i*) to SC1(N) is referred to as a "select state", and a state in which a light emission control signal in a low (active) state is applied to the emission control lines EM(1) to EM(N) is referred to as a "select state".

A transistor layer in which a plurality of transistors are formed and a light-emitting element layer in which a plurality of light-emitting elements are formed are formed in order from a substrate. The drive transistor T1 has a double gate structure having a drain electrode (a conduction terminal) D, a source electrode (a conduction terminal) S, and a gate electrode (a first control terminal) G, as well as another gate electrode (a second control terminal) B (hereinafter referred to as a "back gate electrode") that is formed on the side opposite to the gate electrode G (below a semiconductor layer) with the semiconductor layer (not illustrated) interposed between the gate electrodes. That is, the back gate electrode, the semiconductor layer, and the gate electrode are provided in order from the substrate. When the back gate electrode B receives a light emission control signal of the emission control line EM(j) in the drive transistor T1 with the double gate structure, the drive transistor T1 has the characteristic that its threshold voltage changes in accordance with the potential of the signal. Note that the conduction terminals (the source electrode and the drain electrode) may be formed of a metal layer that is a different layer from that of the back gate electrode and the gate electrode, or may be formed by making the semiconductor layer conductive.

In the pixel circuit 40, the drive transistor T1 has the gate electrode G connected to a second conduction terminal ct2 (described later) of the write transistor T2, the drain electrode D connected to the high-level power supply line ELVDD for organic EL, the source electrode S connected to the anode terminal of the light-emitting element 7, and the back gate electrode B connected to the emission control line EM(j). In addition, the write transistor T2 has a gate electrode (a control terminal) connected to the scanning control line SC1(*j*), a first conduction terminal ct1 connected to the data signal line DT(i), and the second conduction terminal ct2 connected to the gate electrode G of the drive transistor T1. Furthermore, the capacitor Cst has a pair of counter electrodes, a first counter electrode thereof being connected to the gate electrode G of the drive transistor T1 and a second counter electrode thereof being connected to the source electrode S of the drive transistor T1. The cathode terminal of the light-emitting element 7 is connected to the low-level power supply line ELVSS for organic EL. A voltage applied to the high-level power supply line ELVDD for organic EL is specifically 20 V, for example, and a voltage applied to the low-level power supply line ELVSS for organic EL is specifically 0 V, for example.

Note that, although the drive transistor T1 is configured such that the gate electrode G of the drive transistor T1 is connected to the drain electrode of the write transistor T2 and the back gate electrode B of the drive transistor T1 is connected to the emission control line EM(j) in the pixel circuit 40 of FIG. 3, conversely, it may be configured such that the gate electrode G above the semiconductor layer of the drive transistor T1 is connected to the emission control line EM(j) and the back gate electrode B below the semiconductor layer of the drive transistor T1 is connected to the drain electrode of the write transistor T2.

Figure 4:
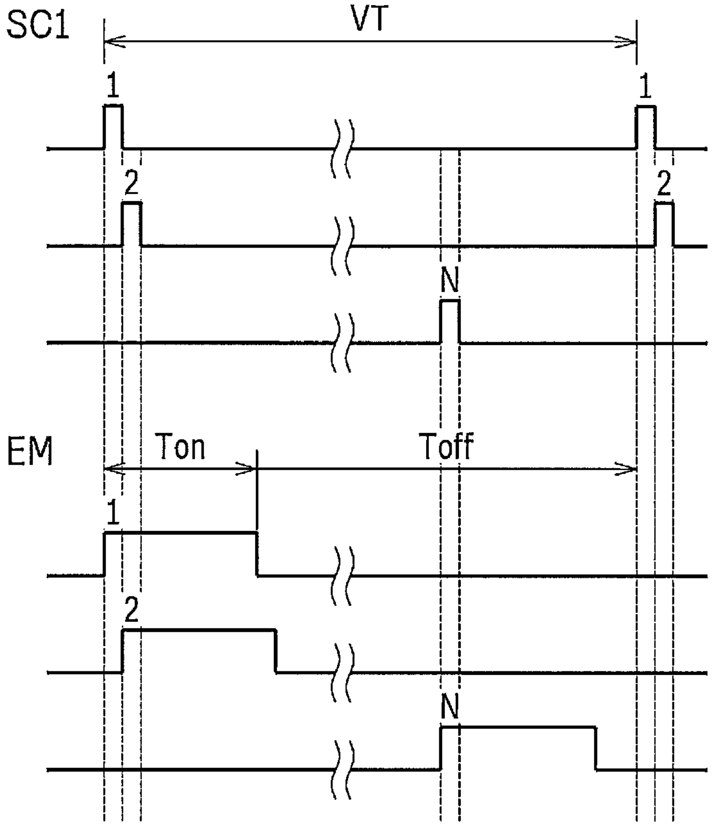
FIG. 4 is a diagram illustrating a timing chart of a scanning control signal and an emission signal of the drive circuit.

FIG. 4 is a timing chart diagram of scanning control signals of the scanning control lines SC1(*i*) to SC1(N) and emission signals of the emission control lines EM(1) to EM(N). In the same drawing, the scanning control lines SC1(*i*) to SC1(N) are sequentially selected by the gate scanning circuit 300, and the emission control lines EM(1) to EM(N) are also sequentially selected by the emission control circuit 400 for the predetermined period Ton and are controlled such that the emission control lines are in a non-select state after the predetermined period Ton elapses. Note that, in the drawing, "1", "2", and "N" indicate row numbers.

In this case, in the scanning control line SC1(*j*) and the emission control line EM(j) (1≤j≤N) in the same row, the emission control line EM(j) is selected at the same time as selection of the scanning control line SC1(*j*), and the emission signal is kept in the high state for the predetermined period Ton. Accordingly, when the scanning control line SC1(*j*) is in the select state (in the high state of the scanning control signal) in the pixel circuit 40 in the j-th row, the write transistor T2 is turned on (active), and thus the data signal (a data voltage Vd) applied to the data signal line DT(i) is held in (written into) the capacitor Cst. Hereinafter, a period in which the scanning control line SC1(*j*) is in the select state will be referred to as a write period of a data signal. In addition, in the select state of the emission control line EM(j), the drive transistor T1 is turned on due to the high state of the emission signal, as will be described in detail later, a drive current of the data voltage Vd flows into the light-emitting element 7, and thus the light-emitting element 7 emits light. Hereinafter, a period in which the emission control line EM(j) is in the select state will be referred to as a light emission period of the light-emitting element 7. Then, when the emission control line EM(j) is in a non-select state, the drive transistor T1 is turned off due to the low state of the emission signal, as will be described in detail later, no drive current flows into the light-emitting element 7, and thus the light-emitting element 7 emits no light (turns off).

Accordingly, luminance of the light-emitting element 7 is determined based on the data signal (the data voltage Vd) of the data signal line DT(i) and the duty ratio between a high period Ton and an off period Toff of the emission signal (Ton/Toff) in one vertical period VT. Based on this point, if the duty ratio changes by a minute value even when data signals have the same value, low gray-scale display of pixels can be performed on the display portion 500 in an analog manner.

Low Voltage and High Voltage of Emission Signal

Here, setting of a low voltage and a high voltage of the emission signal (light emission control signal) applied to the back gate electrode B of the drive transistor T1 will be described. A low voltage of the emission signal is a voltage that turns off the n-channel drive transistor T1 having the back gate electrode B, and a high voltage is a voltage that turns on the drive transistor T1. Hereinafter, specific voltage values will be described. First, a low voltage of the emission signal will now be described.

The back gate electrode B has a function to adjust (to change the magnitude of) the threshold (voltage) Vth of the drive transistor T1 in accordance with an applied voltage value. The adjusted threshold Vth' is expressed using the following equation.

$$Vth' = Vth - \kappa \times Vbs$$

Here, Vbs is a back gate-source voltage of the drive transistor T1, and κ is a positive coefficient indicating the degree at which the threshold of the drive transistor T1 changes in accordance with the voltage of the emission signal, specifically, a positive coefficient indicating the degree at which the threshold is adjusted in accordance with the back gate-source voltage Vbs. In other words, it is a value corresponding to a slope and is the absolute value of a change amount of the threshold Vth' with respect to a change amount of the back gate-source voltage Vbs. The coefficient κ is proportional to a capacity ratio between a gate insulating film (not illustrated) that covers the gate electrode G of the drive transistor T1 and a gate insulating film that covers the back gate electrode B (not illustrated), and the coefficient value is 1 if the capacity ratio of the films is 1:1.

Thus, when a potential Vb of the back gate electrode B is higher than a potential Vs of the source electrode S, the adjusted threshold Vth' decreases and the amount of flowing drive current increases. On the other hand, when a potential Vb of the back gate electrode B is lower than a potential Vs of the source electrode S, the adjusted threshold Vth' increases and the amount of flowing drive current decreases.

An overdrive voltage Vov for determining an on or off state of the drive transistor T1 changes due to an adjusted threshold Vth', and a changed overdrive voltage Vov' is expressed using the following equation.

$$Vov' = Vov + \kappa \times Vbs$$

Here, the overdrive voltage Vov is Vgs−Vth'.

Because the condition of the overdrive voltage Vov' for turning off the drive transistor T1 is Vov'<0, if the back gate-source voltage Vbs has the relationship of Vbs<−Vov/κ, the back gate-source voltage Vbs can reliably turn off the drive transistor T1. If the above-described expression is converted to an expression of a voltage Vem applied to the back gate electrode B (which is a voltage of a light emission control signal and will be referred to as a back gate voltage below), it is expressed using the following expression.

$$Vem < -Vd/\kappa + \{(1+\kappa)\cdot Vs + Vth\}/\kappa$$

Here, Vd is a data voltage of the data signal line DT(i), and Vs is a source voltage of the drive transistor T1.

To satisfy the above expression, the voltage Vem of a light emission control signal to turn off the drive transistor T1 may be set to an appropriate voltage.

An example to determine the back gate voltage Vem will be introduced below. The second term on the right side of the expression has a positive value. In addition, a data voltage maxVd corresponding to the maximum luminance of a pixel (white display) is set, −Vd/κ+{(1+κ)·Vs+Vth}/κ<−maxVd/κ is satisfied. Thus, Vem<−maxVd/κ holds and if the absolute value of the back gate voltage Vem is set as maxVd/κ, the drive transistor T1 can be turned off even when the source voltage Vs or the threshold Vth is changed in the design of the drive transistor T1, or the like. Note that the example described above is an estimated maximum value of the absolute value of the back gate voltage Vem. If there is a need to widen a margin, the absolute value may be increased. The absolute value may also be decreased depending on the design of the source voltage Vs, the threshold Vth, or the like. In the present embodiment, for example, a low voltage VL of the emission signal is set to −7.5 V, for example, if the coefficient κ is set to 1, a voltage value of the second term on the right side is set to a certain volt (e.g., 2 V), and the data voltage maxVd corresponding to the maximum luminance is set to 9 V.

Next, a high voltage of the emission signal will be described. For example, when a data voltage minVd corresponding to the minimum luminance of a pixel (black display) is set, a high voltage is set to reliably turn off the drive transistor T1. With this setting, it is possible to increase an amount of drive current flowing from the drive transistor T1 to the light-emitting element 7 while the drive transistor T1 is turned on in accordance with an increase of the luminance of the pixel from that of black display.

Although the n-channel drive transistor T1 has been described above, a p-channel drive transistor T1 can be configured similarly.

Thus, in the present embodiment, the emission control line EM(j) is connected to the back gate electrode B of the drive transistor T1 with the double gate structure and an emission signal of the emission control line EM(j) is changed to be in a high state and a low state to change the threshold of the drive transistor T1, whereby the on-state and the off-state of the drive transistor T1 can be controlled and luminance of the light-emitting element 7 can be changed. Thus, the number of constituent transistors of the pixel circuits can be reduced with no need to separately dispose a transistor for light emission control in series with a drive transistor in a pixel circuit, unlike in the related art, and therefore high definition can be achieved.

Furthermore, because the scanning control signal and the emission signal in the same row transition to the high state at the same timing and the high periods of the signals overlap in the timing chart of FIG. 4, it is possible to realize writing of a data signal into the capacitor Cst due to the on-state of the write transistor T2 and a reset (initialization) of the capacitor Cst due to the on-state of the drive transistor T1.

Modified Example

Figure 5:
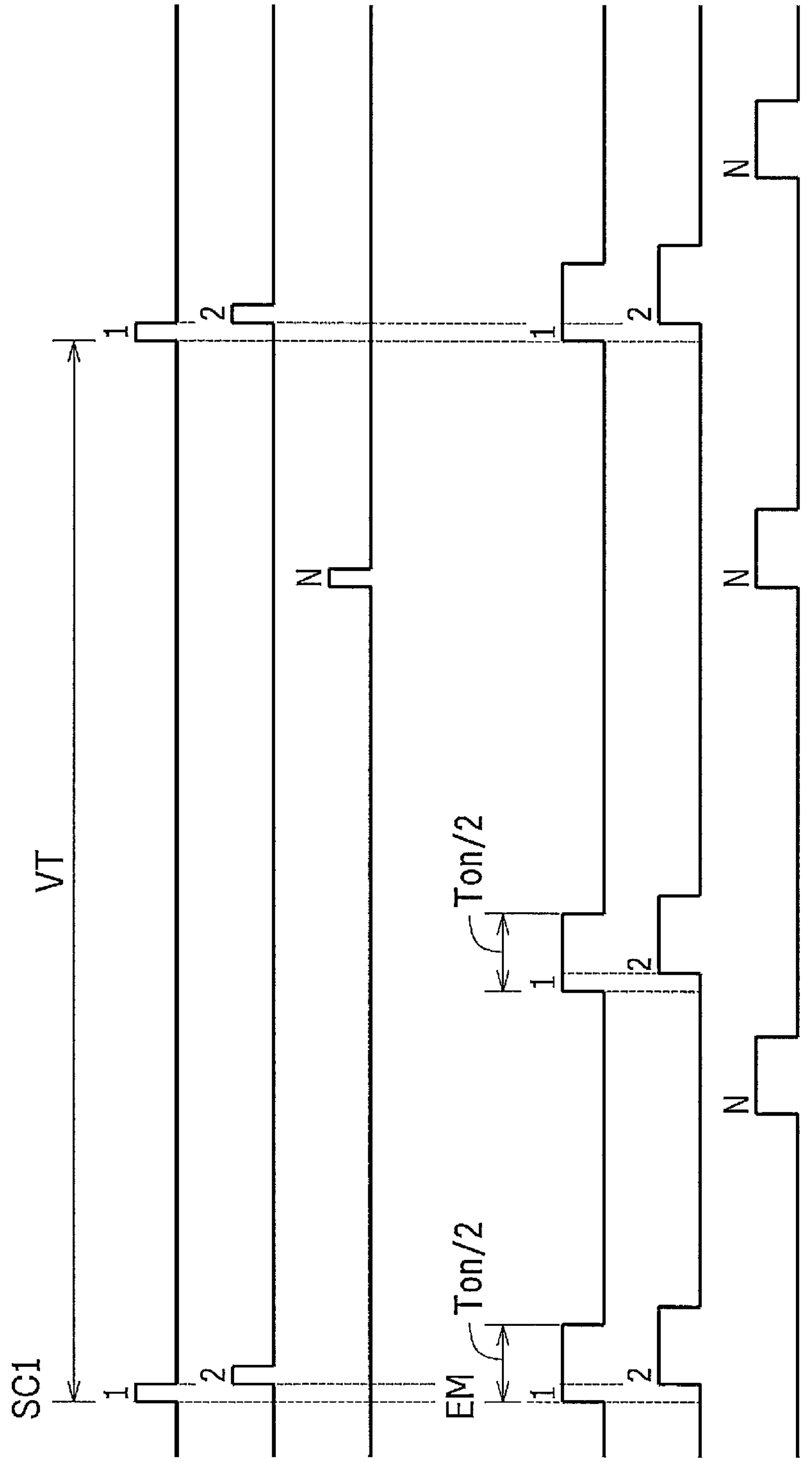
FIG. 5 is a diagram illustrating a modified example of the timing chart illustrated in FIG. 4.

Although it is controlled such that the emission control line EM(j) is set to be in one select state (a high state of the emission signal) in one vertical period in FIG. 4, it is possible to control such that the emission signal is in a high state a plurality of times (two times in the drawing) by division, as illustrated in FIG. 5. In this case, it is possible to increase the light emission frequency apparently by reducing the light emission period of the light-emitting element 7 for one light emission operation (Ton/2 in the drawing), and thus flickering that occurs when the duty ratio of the emission signal is low, particularly when display is performed with low luminance, can be reduced. The sum of the light emission periods is Ton/2+Ton/2=Ton, remaining unchanged.

In addition, a still image display mode may be set to one selected state, and a moving image display mode may be divided into multiple modes to be set to selected states. With this configuration, afterimages of a moving image can be easily prevented. In this case, it is preferable to set the total light emission periods to be the same as described above even when division into multiple pieces is made.

Furthermore, in a case where the display device is used for being placed inside a vehicle, for example, a day mode with high luminance (a first mode) and a night mode with low luminance (a second mode in which the peak luminance is lower than that of the first mode) are set. A light emission period Ton in the night mode is shorter than a light emission period Ton in the day mode. For example, the light emission period Ton in the day mode is 1000 H, and the light emission period Ton in the night mode is 2 H. With this configuration, the peak luminance of day and night can be easily adjusted even without increasing the number of thin film transistors.

Second Embodiment

Next, a second embodiment of the disclosure will be described.

Figure 6:
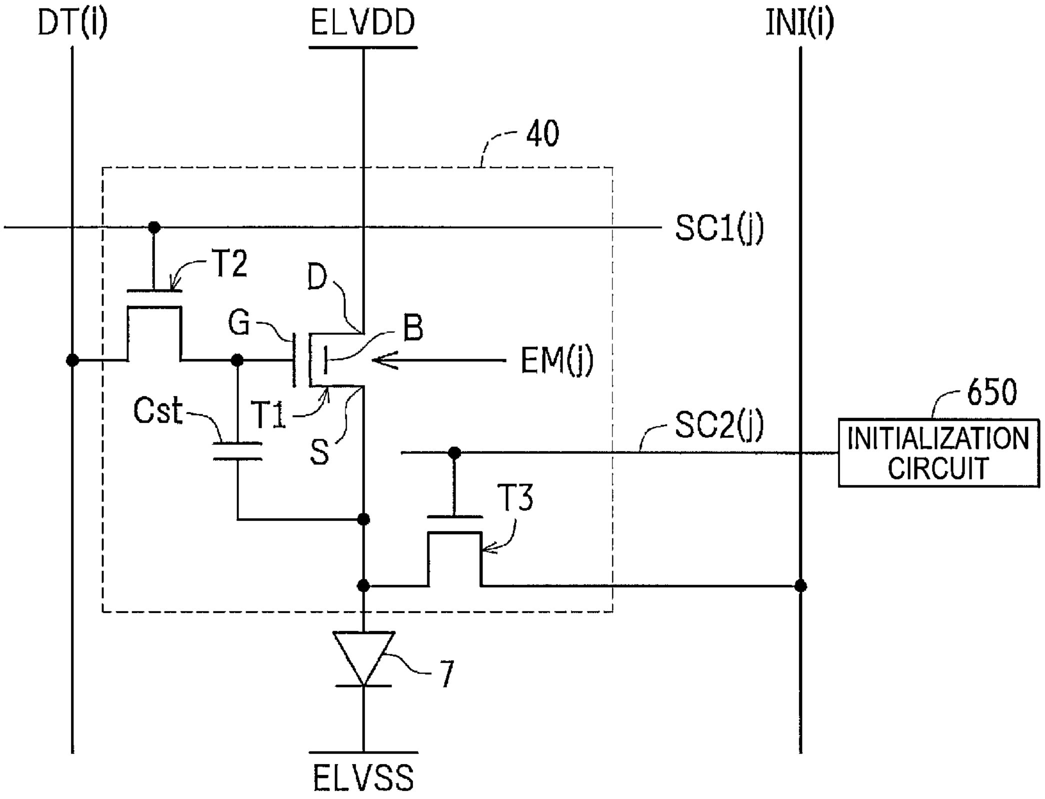
FIG. 6 is a circuit diagram illustrating a configuration of a drive circuit included in a display device according to a second embodiment of the disclosure.

FIG. 6 illustrates a circuit diagram of the pixel circuit 40 of FIG. 3 to which a configuration for initialization of the capacitor Cst has been added.

In the drawing, an initialization transistor T3 has been further added to the configuration of the pixel circuit 40 of FIG. 3 described above. In addition, an initialization power supply line INI(i) and a second scanning control line (a second scanning control line) SC2(*j*) are added to the display portion (a display region) 500. Furthermore, an initialization circuit (a second scanning control circuit) 650 for driving the second scanning control line SC2(*j*) is disposed in the non-display region 550 on the outer periphery of the display portion 500 (see FIG. 1). A voltage (an initialization voltage) of the initialization power supply line INI(i) is set to a voltage near the potential of the low-level power supply line ELVSS for organic EL. In addition, the initialization power supply line INI(i) is disposed extending parallel to the data signal line DT(i), and the second scanning control line SC2(*j*) is disposed extending parallel to the first scanning control line SC1(*j*). The initialization transistor T3 has a source electrode (a first conduction terminal) connected to the initialization power supply line INI(i), a drain electrode (a second conduction terminal) connected to an electrode of the drive transistor T1 on the light-emitting element 7 side, that is, the source electrode S, and a gate electrode (a control terminal) connected to the second scanning control line SC2(*j*). Furthermore, the capacitor Cst of the pixel circuit 40 has two counter electrodes, the first counter electrode thereof being connected to the gate electrode G of the drive transistor T1 and the second counter electrode thereof being connected to the drain electrode of the initialization transistor T3. Note that, although the initialization power supply line INI(i) is disposed parallel to the data signal line DT(i), it may be disposed parallel to the first scanning control line SC1(*j*). In addition, the initialization circuit (a second scanning control circuit) 650 is configured as a separate circuit from the gate scanning circuit (a first scanning control circuit) 300, it may be configured as the same circuit as the gate scanning circuit 300.

Figure 7:
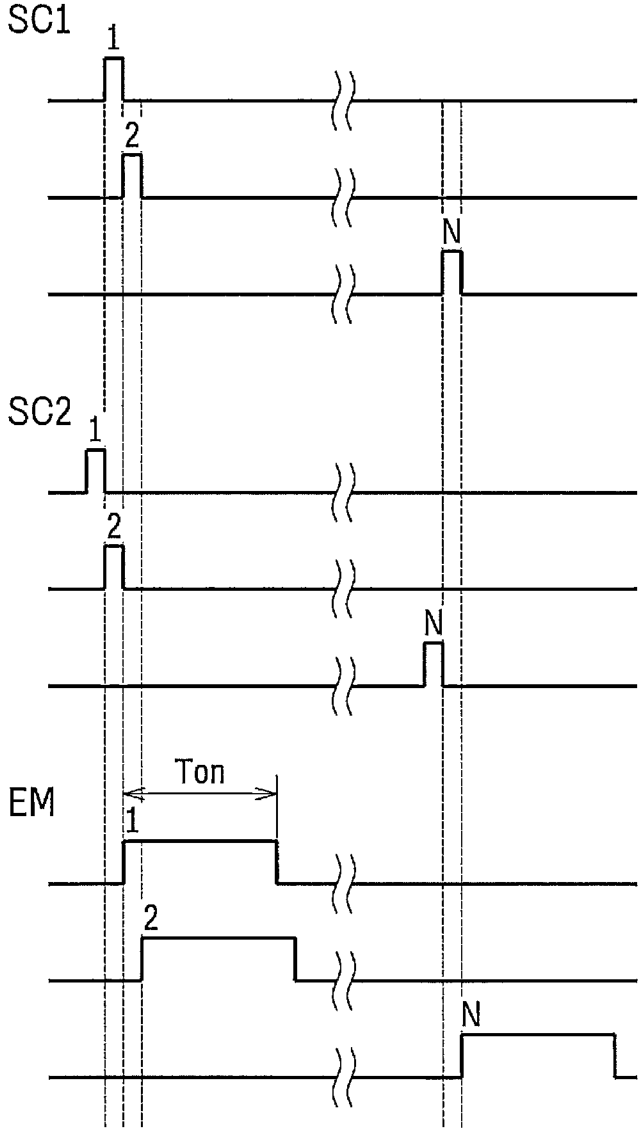
FIG. 7 is a timing chart diagram illustrating a state of selection of a first scanning control line, a second scanning control line, and an emission control line in the drive circuit.

FIG. 7 is a timing chart illustrating selection states of first scanning control lines SC1(1) to SC1(N), second scanning control lines SC2(1) to SC2(N), and emission control lines EM(1) to EM(N). In the drawing, in the period before the period in which the select state (the write period of a data signal) of the first scanning control line SC1(*j*) in the j-th (1≤j≤N) row, the second scanning control line SC2(*j*) in the same row is in the select state. In addition, in the write period of the data signal, the emission control line EM(j) in the same row is the non-select state (the low state of the emission signal), and after the write period of the data signal ends, the emission signal during the predetermined period Ton is controlled such that the signal enters the high state and the select state.

Note that the second scanning control line SC2(*j*) may be connected to the first scanning control line SC1 one or two rows before, that is, the SC1(*j*−1) or SC1(*j*−2). FIG. 7 is an example in which the second scanning control line is connected to the first scanning control line one row before.

Thus, in the case where the initialization transistor T3 is provided in the pixel circuit 40, the second scanning control line SC2(*j*) enters the select state in the period before the write period of the data signal, the initialization transistor T3 is turned on, and the second counter electrode of the capacitor Cst is controlled to the initialization voltage of the initialization power supply line INI(i). In this state, the drive transistor T1 is turned off due to the non-select state (the low state of the emission signal) of the emission control line EM(j).

Then, when the initialization of the capacitor Cst ends, the write period of the data signal arrives, the write transistor T2 is turned on due to the select state of the first scanning control line SC1(*j*), and then the data signal of the data signal line DT(i) is accurately written into the capacitor Cst.

Furthermore, when the writing of the data signal is completed, the emission control line EM(j) enters the select state (the high state of the emission signal), the drive transistor T1 is turned on during the predetermined period Ton to cause a drive current to flow, and thus the light-emitting element 7 emits light. Then, after the end of the period Ton, the drive transistor T1 is turned off, and the light-emitting element 7 is in a non-light emission state.

In the case where the initialization transistor T3 is provided in the pixel circuit 40 as described above, it is possible to reliably prevent the situation in which the data signal before the one vertical period VT remains in the capacitor Cst and the next data signal cannot be accurately written into the capacitor Cst at the time of writing of the data signal into the capacitor Cst.

Modified Example 1

Figure 8:
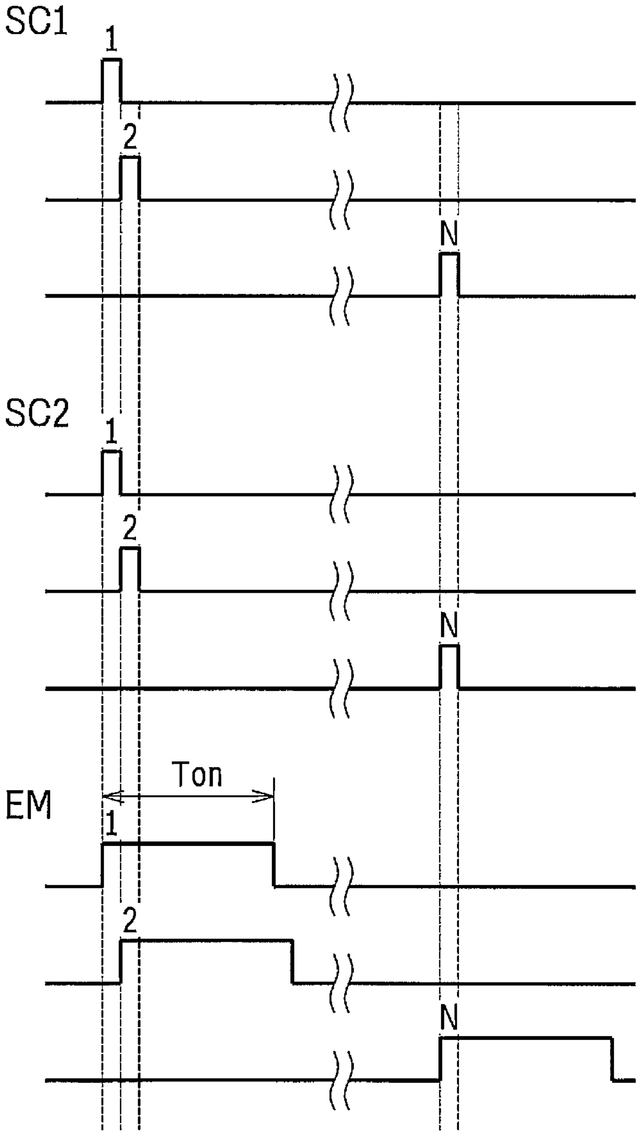
FIG. 8 is a diagram illustrating a first modified example of the timing chart in a case where a data signal is written in the drive circuit.

FIG. 8 is a diagram illustrating a configuration (a first configuration) in which a data signal is written into the capacitor Cst.

A configuration of the pixel circuit 40 in the present modified example is the same as that of FIG. 6 described above. FIG. 8 is a timing chart in the case where a data signal is written in the present configuration. In the drawing, in a data write period of the data signal, that is, in a select state of the first scanning control line SC1(*j*), the second scanning control line SC2(*j*) is also controlled such that it enters a select state. In addition, the emission control line EM(j) is controlled such that it is in a select state for a predetermined period Ton from the time when the first scanning control line SC1(*j*) enters the select state.

Note that the second scanning control line SC2(*j*) may be connected to the first scanning control line SC1(*j*) of the same row.

Thus, in the write period of a data signal, the write transistor T2 is turned on, so that the data signal of the data signal line DT(i) is applied to the first counter electrode of the capacitor Cst, and thus an initialization voltage Vi is applied to the second counter electrode as the initialization transistor T3 is turned on. In this way, a new data signal (a data voltage Vd) that does not depend on the state before writing of the data signal is written into the capacitor Cst, and a gate-source voltage Vgs of the drive transistor T1 becomes a predetermined voltage. At this time, although a through-current passes through the drive transistor T1 and the initialization transistor T3 from the high-level power supply line ELVDD for organic EL and flows to the initialization power supply line INI(i) because the drive transistor T1 is in an ON state, the gate-source voltage Vgs of the drive transistor T1 does not change due to the capacitor Cst.

In addition, when the write period of the data signal ends, the write transistor T2 and the initialization transistor T3 are turned off. In this state, the drive current flows in the light-emitting element 7 because the drive transistor T1 is still in an ON state, the potential of the source electrode S of the drive transistor T1 fluctuates due to the drive current, but the potential of the gate electrode G of the drive transistor T1 is linked by the capacitor Cst, and the gate-source voltage Vgs of the drive transistor T1 is unchanged.

In this manner, in the first modified example, a new data signal that does not depend on the state before writing of the data signal can be written into the capacitor Cst.

Modified Example 2

Figure 9:
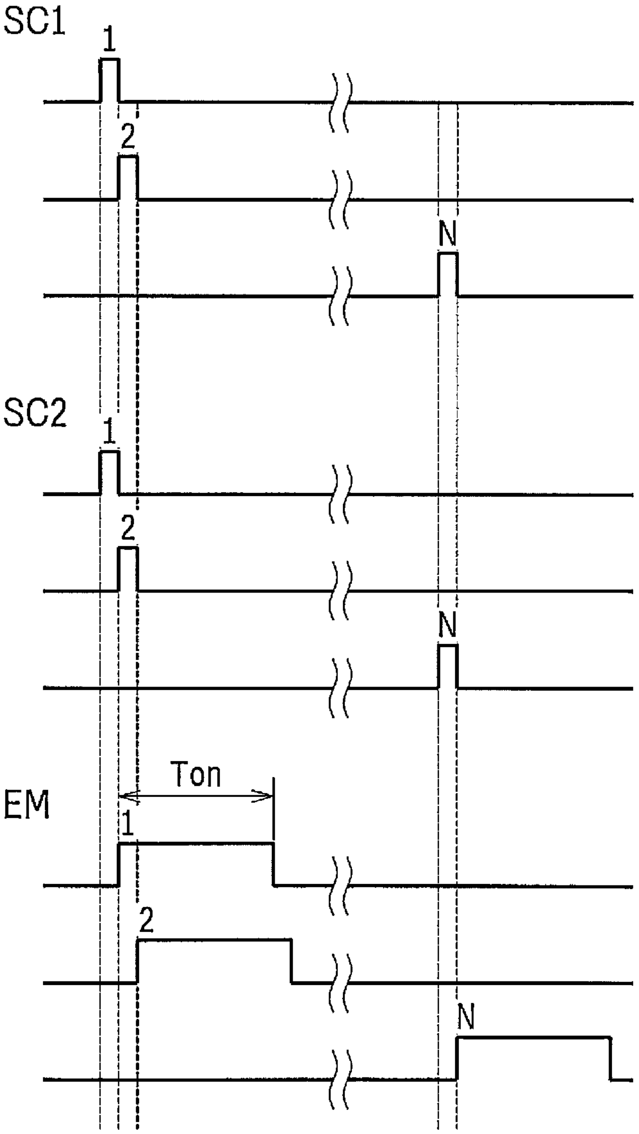
FIG. 9 is a diagram illustrating a second modified example of the timing chart in a case where a data signal is written in the drive circuit.

FIG. 9 is a diagram illustrating a configuration (a second configuration) in which a data signal is written into the capacitor Cst.

A configuration of the pixel circuit 40 in the present modified example is the same as that of FIG. 6 described above. FIG. 9 is a timing chart in the case where a data signal is written in the present configuration. Although the first scanning control line SC1(*j*), the second scanning control line SC2(*j*), and the emission control line EM(j) are all controlled such that the lines are in the select state in the write period of the data signal in FIG. 8, the emission control line EM(j) is controlled such that the line is in a non-select state in FIG. 9. Because the drive transistor T1 is turned off in this state, the data signal of the data signal line DT(i) is written into the capacitor Cst with no through-current passing through the initialization transistor T3 from the high-level power supply line ELVDD for organic EL and flowing to the initialization power supply line INI(i).

Note that the second scanning control line SC2(*j*) may be connected to the first scanning control line SC1(*j*) of the same row.

In addition, after the write period of the data signal ends, the first scanning control line SC1(*j*) and the second scanning control line SC2(*j*) are controlled such that both lines are in a non-select state and the emission control line EM(j) is controlled such that the line is in a select state for the predetermined period Ton. In this state, although the potential of the gate electrode G of the drive transistor T1 fluctuates due to a parasitic capacitance of the emission control line EM(j) or the drive current flowing in the light-emitting element 7, the gate-source voltage Vgs of the drive transistor T1 is unchanged due to the capacitor Cst.

Thus, in the second modified example, the data signal can be written into the capacitor Cst in the write period of the data signal with no through-current passing through the initialization transistor T3 and flowing to the initialization power supply line INI(i).

The display mode in which an image is displayed on the display device has been described so far, and now a measurement mode in which characteristics of the drive transistor are measured will be described below.

Figure 10:
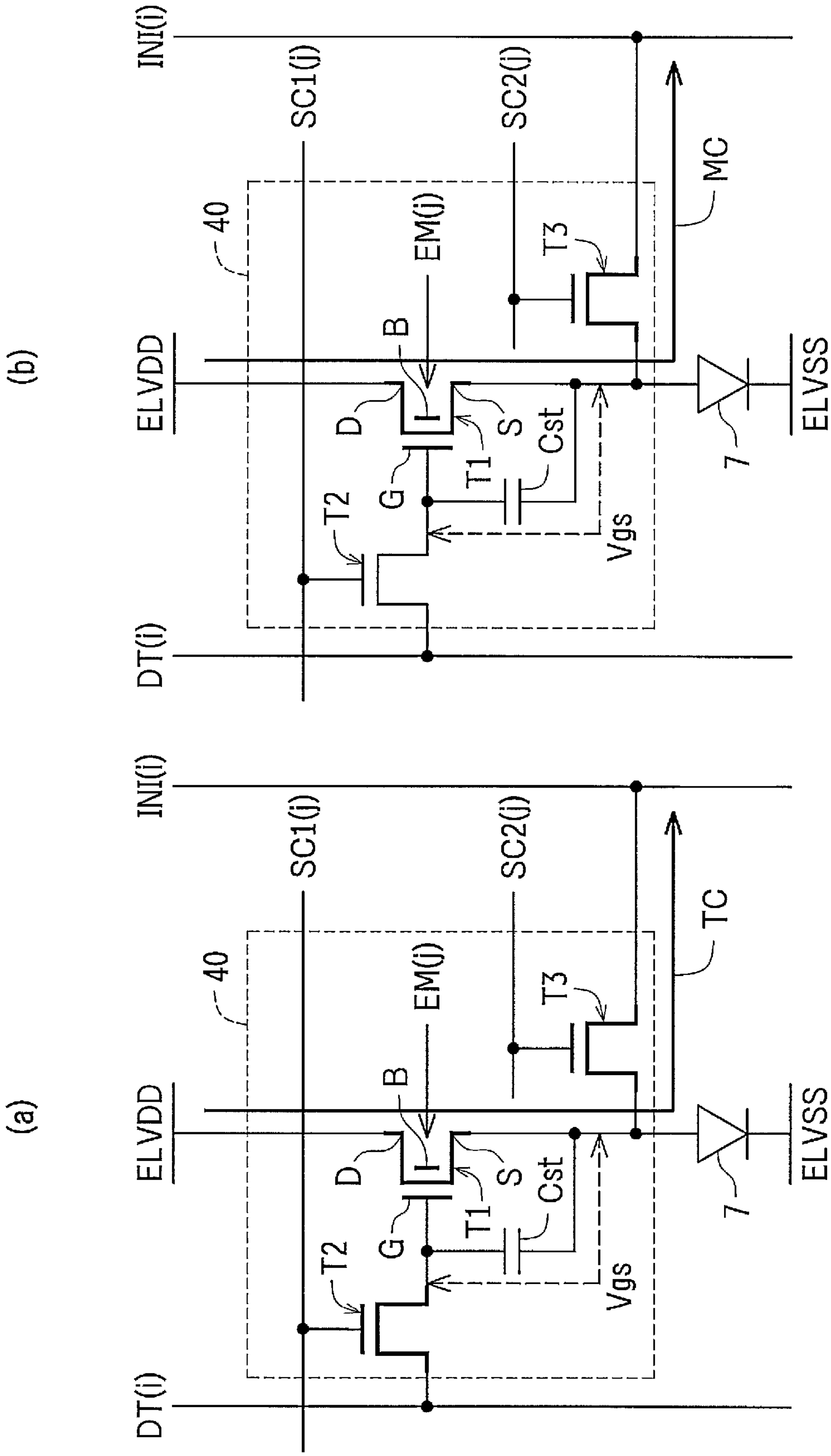
FIG. 10 illustrates a state of operation of a drive circuit when measuring characteristics of a drive transistor, FIG. 10(*a*) is a diagram illustrating a state in which a data signal is written, and FIG. 10(*b*) is a diagram illustrating a state in which a current flowing in the drive transistor is measured.
Figure 11:
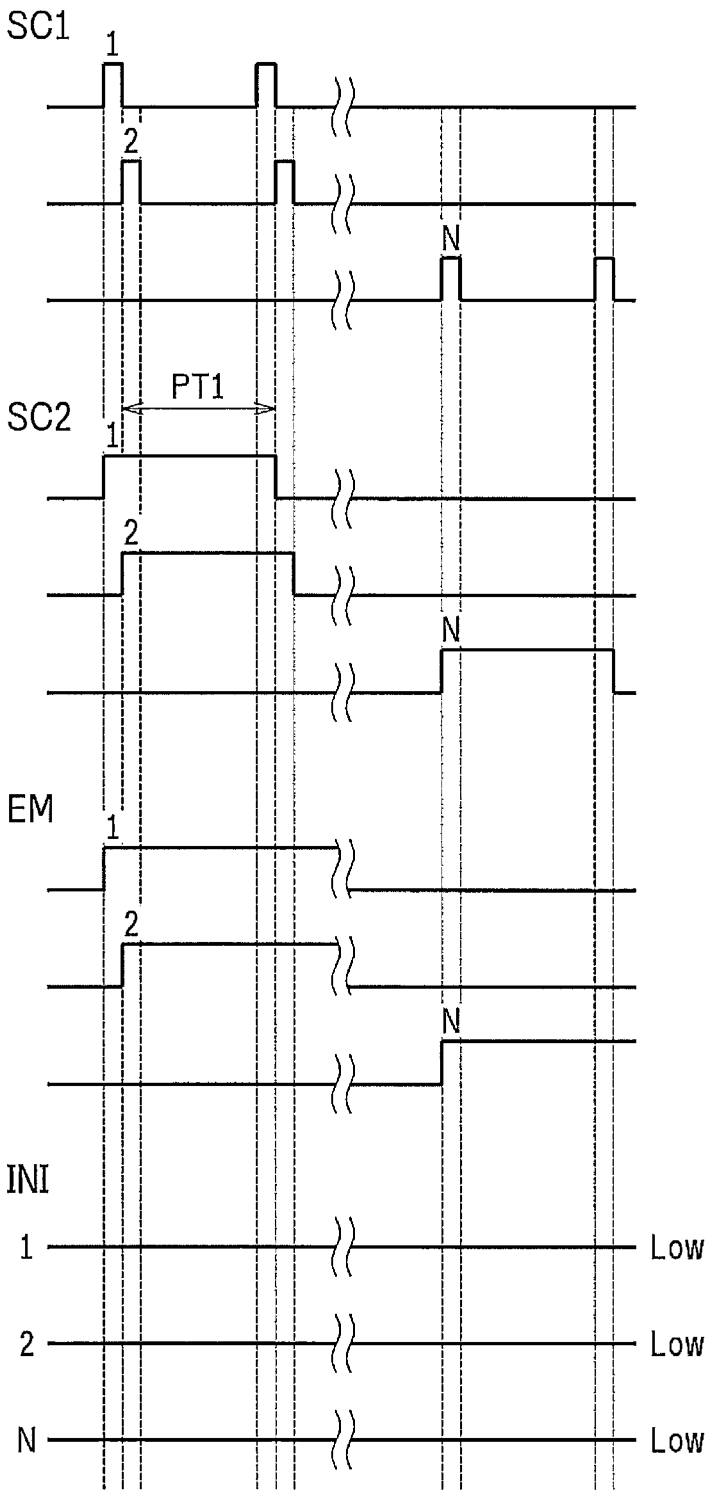
FIG. 11 is a diagram illustrating a timing chart at the time of measuring characteristics of the drive transistor.

FIGS. 10 and 11 are diagrams illustrating a configuration for measuring characteristics of the drive transistor T1.

A configuration of the pixel circuit 40 illustrated in FIGS. 10(*a*) and (*b*) is the same as that in FIG. 6. FIG. 11 illustrates a timing chart at the time of measuring characteristics of the drive transistor T1. The first scanning control line SC1(*j*), the second scanning control line SC2(*j*), and the emission control line EM(j) are all in the select state in the write period of a data signal in FIG. 11. As a result, all of the drive transistor T1, the write transistor T2, and the initialization transistor T3 are turned on (the ON state is indicated by thick lines) as illustrated in FIG. 10(*a*). In this state, a data signal for characteristic measurement of the data signal line DT(i) is applied to the first counter electrode of the capacitor Cst while an initialization voltage is applied to the second counter electrode of the capacitor Cst, and thus the gate-source voltage Vgs of the drive transistor T1 has a predetermined value. At this time, although a through-current TC passes through the drive transistor T1 and the initialization transistor T3 from the high-level power supply line ELVDD for organic EL and flows to the initialization power supply line INI(i) because the emission control line EM(j) is in a select state, the gate-source voltage Vgs of the drive transistor T1 does not change due to the capacitor Cst.

Then, although the first scanning control line SC1(*j*) is in a non-select state after the write period of the data signal ends, by setting a predetermined period PT1 (<one vertical period VT) as a characteristic measurement period, the second scanning control line SC2(*j*) and the emission control line EM(j) maintain the select state in the characteristic measurement period PT1, and the initialization power supply line INI(i) is connected to a current measurement circuit (which will be described below). Only the drive transistor T1 and the initialization transistor T3 are turned on (the ON state is indicated by thick lines) as illustrated in FIG. 10(*b*). This causes a monitoring current MC to pass through the drive transistor T1 and the initialization transistor T3 from the high-level power supply line ELVDD for organic EL to flow to the initialization power supply line INI(i), the monitoring current MC is measured by the current measurement circuit disposed in the outside, and thus characteristics of the drive transistor T1 are measured. Note that, in this case, control may be performed to increase the potential of the low-level power supply line ELVSS for organic EL in order to reduce a leakage current flowing from the drive transistor T1 to the light-emitting element 7.

In this way, unlike the display mode, the period of the select state of the second scanning control line SC2(*j*) is longer than the period of the select state of the first scanning control line SC1(*j*) in the measurement mode. For this reason, in the present configuration, the characteristics of the drive transistor T1 can be measured when the second scanning control line SC2(*j*) and the emission control line EM(j) are in the select state. Because the emission control line EM(j) is in the select state when the light-emitting element 7 emits light, if the characteristics of the drive transistor T1 are measured in the select state of the emission control line EM(j), image sticking of the light-emitting element 7 caused by, for example, the drive transistor T1 can be compensated for.

Note that, after the measurement of the characteristics of the drive transistor T1 is completed as described above, a predetermined data voltage Vd of the data signal line DT(i) is written into the capacitor Cst immediately before the end of the characteristic measurement period PT1, for example, and the data voltage for the characteristic measurement is reset. The reset predetermined data voltage Vd is a voltage obtained by adding the voltage value of the image sticking compensation to the data voltage immediately prior to the characteristic measurement in a case of an image display period, and is a voltage obtained by adding the voltage value of the image sticking compensation to the data voltage corresponding to black display in a case of intensive measurement.

Note that, although the configuration in which the emission control line EM(j) is in the select state when the first scanning control line SC1(*j*) is in the select state has been described, the emission control line EM(j) may be set to be in the select state after the first scanning control line SC1(*j*) enters the non-select state (after data signal writing is completed). With this configuration, it is possible to prevent light emission particularly at the time of data writing.

Measurement of Characteristics of Light-Emitting Element, Part 1

The measurement mode in which characteristics of the light-emitting element are measured will be described below.

Figure 12:
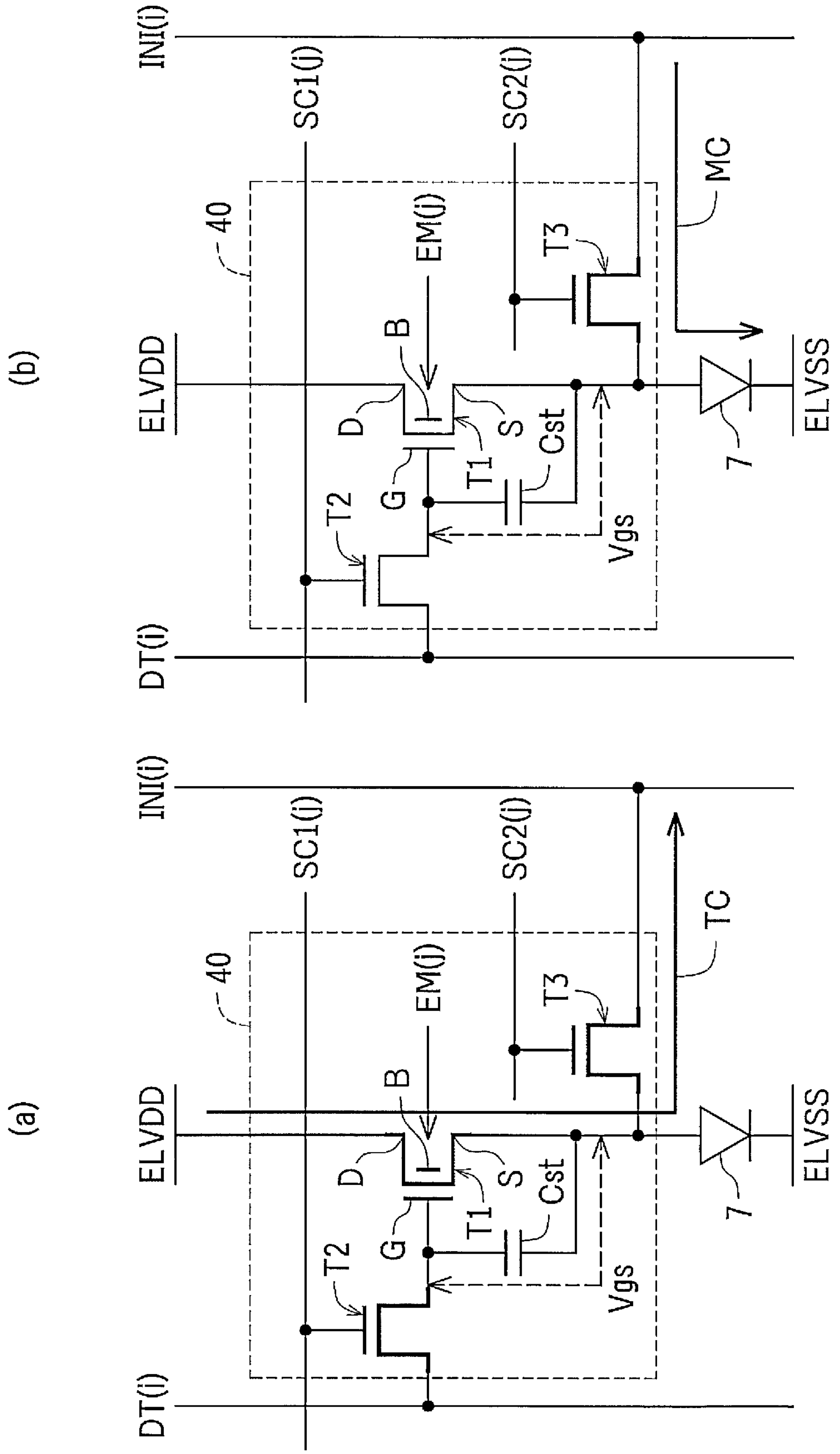
FIG. 12 illustrates a state of operation of a drive circuit when measuring characteristics of a light-emitting element when an emission control line is in a select state, FIG. 12(*a*) is a diagram illustrating a state in which a data signal is written, and FIG. 12(*b*) is a diagram illustrating a state in which a current flowing in the light-emitting element is measured.
Figure 13:
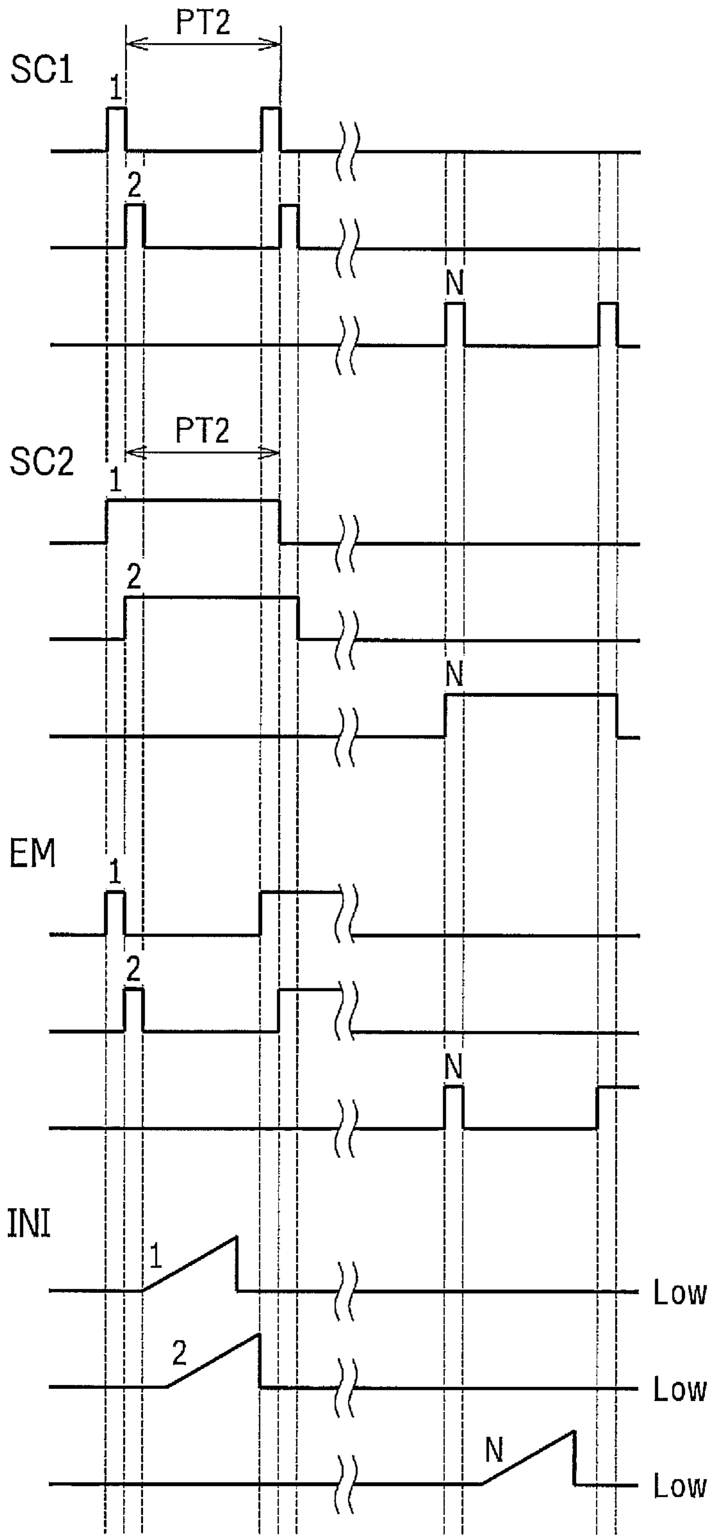
FIG. 13 is a diagram illustrating a timing chart at the time of measuring characteristics of the light-emitting element.

FIGS. 12 and 13 are diagrams illustrating a configuration (a first configuration) for measuring characteristics of the light-emitting element 7.

A configuration of the pixel circuit 40 illustrated in FIGS. 12(*a*) and (*b*) is the same as that in FIG. 6. FIG. 13 shows a timing chart at the time of measuring characteristics of the light-emitting element 7 in the present configuration. The first scanning control line SC1(*j*), the second scanning control line SC2(*j*), and the emission control line EM(j) are all in the select state in the write period of a data signal in FIG. 13. As a result, all of the drive transistor T1, the write transistor T2, and the initialization transistor T3 are turned on (the ON state is indicated by thick lines) as illustrated in FIG. 12(*a*). Thus, a data signal for characteristic measurement of the data signal line DT(i) is applied to the first counter electrode of the capacitor Cst while an initialization voltage is applied to the second counter electrode of the capacitor Cst, and thus the gate-source voltage Vgs of the drive transistor T1 has a predetermined value. At this time, although a through-current TC passes through the drive transistor T1 and the initialization transistor T3 from the high-level power supply line ELVDD for organic EL and flows to the initialization power supply line INI(i) because the emission control line EM(j) is in a select state, the gate-source voltage Vgs of the drive transistor T1 does not change due to the capacitor Cst.

Then, the emission control line EM(j) is set to be in the non-select state after the write period of the data signal ends, and by setting a predetermined period PT2 (<one vertical period VT) as a characteristic measurement period, the second scanning control line SC2(*j*) maintains the select state in the characteristic measurement period PT2, and further an initialization voltage of the initialization power supply line INI(i) is swept into a monotonically increasing waveform in a part of the characteristic measurement period PT2. Note that this sweeping may be of monotonic decrease, without being limited to monotonic increase. With this control, as illustrated in FIG. 12(*b*), only the initialization transistor T3 is turned on (the ON state is indicated by thick lines) to cause a monitoring current MC to pass through the initialization transistor T3 from the initialization power supply line INI(i) to flow to the light-emitting element 7, thus the monitoring current MC is measured by the current measurement circuit (which will be described below) disposed outside while causing the light-emitting element 7 to emit light, thereby measuring the characteristics of the light-emitting element 7.

The first scanning control line SC1(*j*) is in the select state again immediately before the end of the characteristic measurement period PT2 after the sweeping of the initialization voltage of the initialization power supply line INI(i) ends, then a predetermined data signal (a data voltage corresponding to black display, for example) of the data signal line DT(i) is written into the capacitor Cst, and the data signal for characteristic measurement is reset.

Causing the monitoring current MC to flow in the light-emitting element 7 as described above is sequentially performed on each of the light-emitting elements 7 in the first row to the N-th row, thereby measuring characteristics of the light-emitting elements 7 in the rows.

In the characteristic measurement in the characteristic measurement period PT2, it is possible to search for a voltage value for causing a desired current value (a specified current value) to flow to the light-emitting element 7 by sweeping the initialization voltage of the initialization power supply line INI(i).

Note that sweeping of the initialization voltage is an example, and the light-emitting element 7 may be compensated for by applying two voltages corresponding to bright gray scale and dark gray scale to the initialization power supply line INI(i) to measure the current. In addition, the number of voltages may be three or greater by adding an intermediate gray scale thereto.

Measurement of Characteristics of Light-Emitting Element, Part 2

Figure 14:
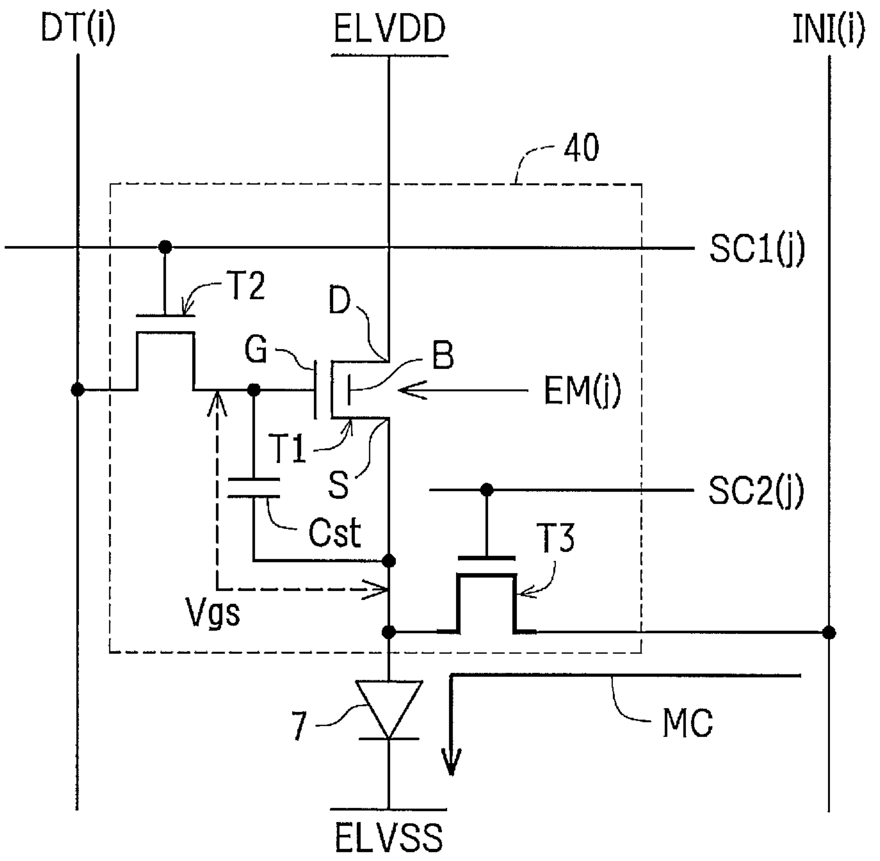
FIG. 14 is a diagram illustrating a state of operation of a drive circuit when characteristics of the light-emitting element are measured when an emission control line is in a non-select state.
Figure 15:
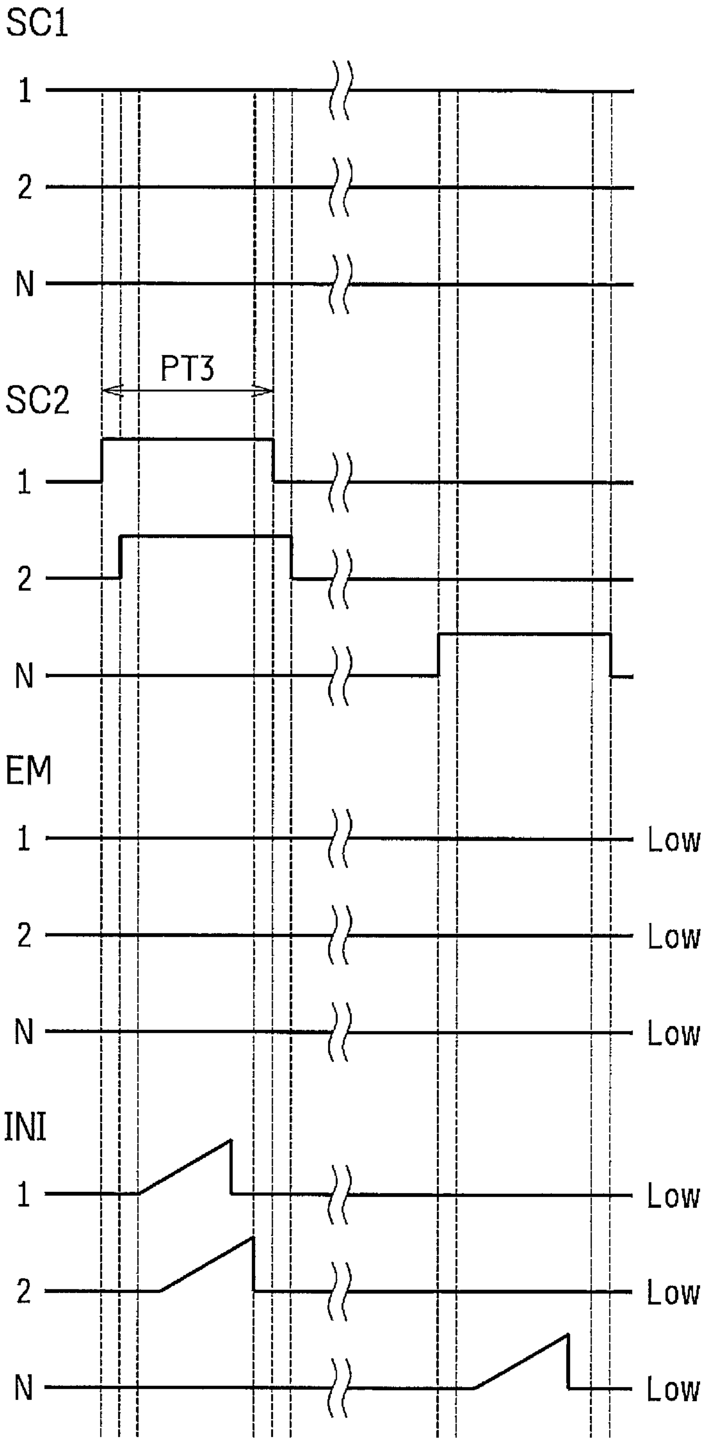
FIG. 15 is a diagram illustrating a timing chart at the time of measuring characteristics of the light-emitting element.

FIGS. 14 and 15 are diagrams illustrating a configuration (a second configuration) for measuring characteristics of the light-emitting element 7.

The configuration of the pixel circuit 40 illustrated in FIG. 14 is the same as that in FIG. 6. FIG. 15 illustrates a timing chart at the time of measuring characteristics of the light-emitting element 7 in the present configuration. In FIG. 15, during the measurement of characteristics of the light-emitting element 7, the first scanning control line SC1(*j*) and the emission control line EM(j) are in the non-select state, the second scanning control line SC2(*j*) is in the select state for a predetermined period PT3, and thus the initialization voltage of the initialization power supply line INI(i) is swept into a monotonically increasing waveform in a part of the predetermined period PT3. Note that this sweeping of monotonic increase may be sweeping of monotonic decrease. With this control, the drive transistor T1 and the write transistor T2 are turned off, and only the initialization transistor T3 is turned on (the ON state is indicated by the thick lines) in the predetermined period PT3 as illustrated in FIG. 14. Because the drive transistor T1 is in the OFF state in this state, it is not necessary to write the data signal of the data signal line DT(i) into the write transistor T2, and the monitoring current MC immediately flows to the light-emitting element 7 due to the ON state of the initialization transistor T3, and thus the characteristics of the light-emitting element 7 can be measured. The predetermined period PT3 is a characteristic measurement period for the light-emitting element 7.

In other words, as the initialization voltage of the initialization power supply line INI(i) is swept into a monotonically increasing voltage in the characteristic measurement period PT3, the monitoring current MC passes through the initialization transistor T3 from the initialization power supply line INI(i) to flow to the light-emitting element 7, thus the monitoring current MC is measured by the current measurement circuit (which will be described below) disposed outside while causing the light-emitting element 7 to emit light, thereby measuring the characteristics of the light-emitting element 7.

Figure 16:
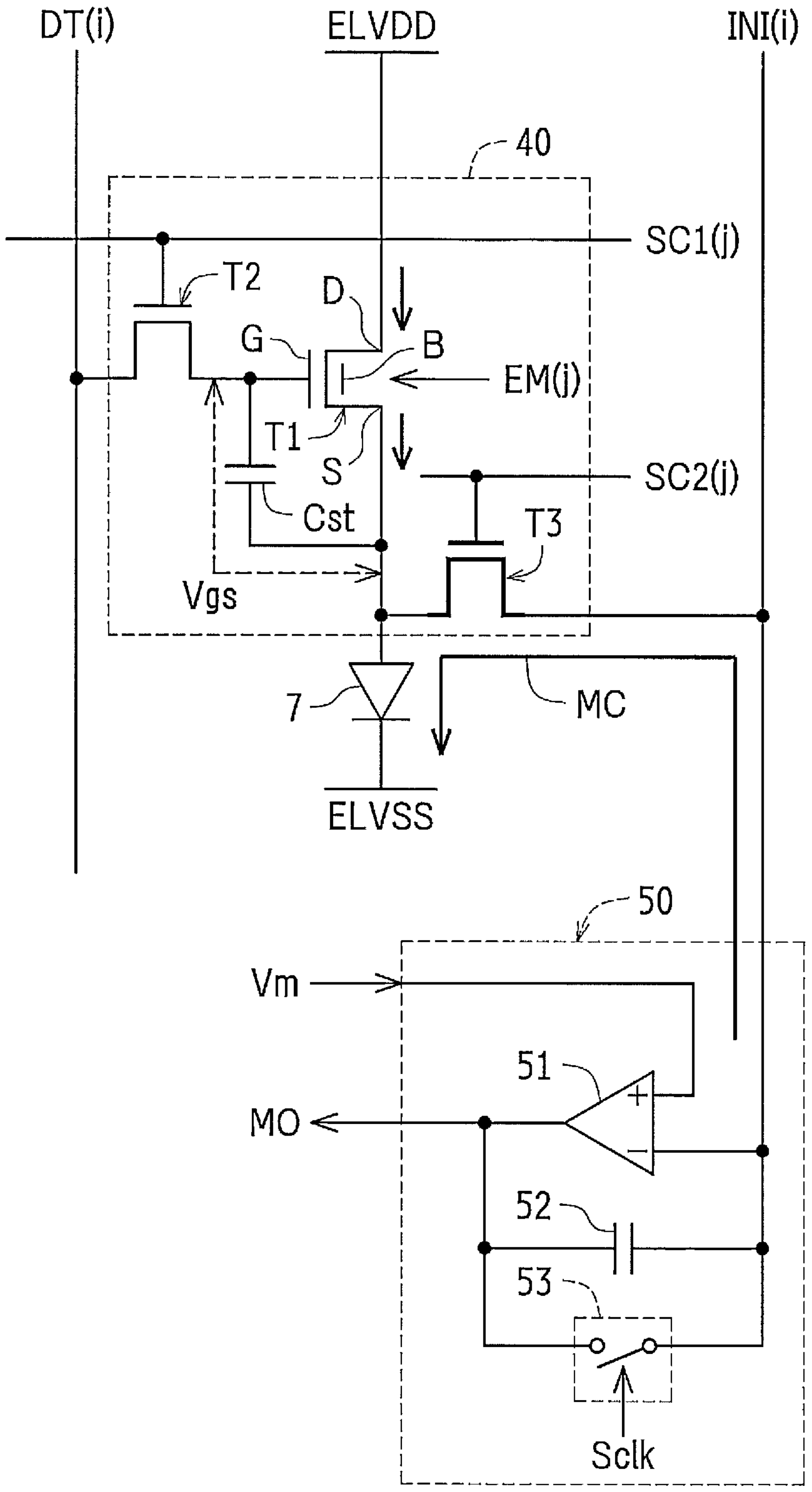
FIG. 16 is a circuit diagram illustrating an internal configuration of a current measurement circuit included in the display device.

FIG. 16 is a circuit diagram illustrating a configuration of the current measurement circuit that measures the monitoring current MC flowing to the light-emitting element 7. In the drawing, the current measurement circuit 50 has a function of supplying a control voltage (initialization voltage) Vm to be swept to the initialization power supply line INI(i) and a function of measuring a current value flowing to the initialization power supply line INI(i).

Specifically, the current measurement circuit 50 includes an operational amplifier 51, a capacitor 52, and a switch 53. The operational amplifier 51 has an inverting input terminal connected to the initialization power supply line INI(i) and a non-inverting input terminal that receives a control voltage (initialization voltage) Vm to be swept. The capacitor 52 and the switch 53 are provided between the output terminal of the operational amplifier 51 and the initialization power supply line INI(i). In this configuration, first, the switch 53 is closed due to a control clock signal Sclk. As a result, the section between the output terminal and the inverting input terminal of the operational amplifier 51 is short-circuited, and the potential of the output terminal of the operational amplifier 51 and the initialization power supply line INI(i) becomes equal to the potential of the control voltage Vm. At the time of measuring characteristics of the light-emitting element 7, the switch 53 is opened due to the control clock signal Sclk. Accordingly, a monitoring current MC passes through the initialization transistor T3 from the initialization power supply line INI(i) to flow to the light-emitting element 7 as indicated by the arrow in the drawing. At this time, the potential of the output terminal of the operational amplifier 51 changes according to the magnitude of the monitoring current MC flowing in the initialization power supply line INI(i) due to the presence of the capacitor 52, and an output current MO of the operational amplifier is measured, thereby measuring characteristics of the light-emitting element 7. In addition, if the drive transistor T1 is turned on at the same time as when the monitoring current MC flows into the light-emitting element 7, a drive current also flows to the drive transistor T1 from the high-level power supply line ELVDD for organic EL as indicated by the arrow in the drawing, and thus the current measurement circuit 50 can measure the drive current.

The embodiments disclosed this time are illustrative in all respects, and do not provide a basis for a limited interpretation. Thus, the technical scope of the disclosure is not to be interpreted only based on the above-described embodiments, and is defined based on the recitation of the claims. In addition, all modifications within the meaning and scope equivalent to the scope of the claims are included.

The invention claimed is:

1. A display device comprising:

in a display region, a first scanning control line, a light emission control line extending parallel to the first scanning control line, a data signal line intersecting the first scanning control line, a pixel circuit provided at an intersection of the first scanning control line and the data signal line, and a light-emitting element provided for each of the pixel circuits; and in a non-display region, a first scanning control circuit configured to drive the first scanning control line and a light emission control circuit configured to drive the light emission control line, wherein each of the pixel circuits includes a drive transistor, a write transistor, and a capacitor configured to hold a data signal, the drive transistor including a first control terminal and a second control terminal positioned above and below a semiconductor layer with the semiconductor layer interposed between the first and second control terminals, the drive transistor configured to cause a drive current to flow to the light-emitting element, the write transistor includes a first conduction terminal connected to the data signal line, a second conduction terminal connected to the first control terminal of the drive transistor, and a control terminal connected to the first scanning control line, the drive transistor includes the second control terminal connected to the light emission control line, the light emission control circuit outputs, to the light emission control line, a light emission control signal that switches between a select state in which the drive transistor is turned on and a non-select state in which the drive transistor is turned off, the display region includes an initialization power supply line and a second scanning control line extending parallel to the first scanning control line, and the non-display region includes a second scanning control circuit configured to drive the second scanning control line, the pixel circuit includes an initialization transistor, the initialization transistor including a first conduction terminal connected to the initialization power supply line, a second conduction terminal connected to a conduction terminal of the drive transistor on the light-emitting element side, and a control terminal connected to the second scanning control line, a first counter electrode of the capacitor is connected to the first control terminal of the drive transistor, and a second counter electrode of the capacitor is connected to the second conduction terminal of the initialization transistor, in a period before a write period of the data signal with respect to the capacitor, the second scanning control circuit sets the second scanning control line to be in a select state to turn on the initialization transistor, and an initialization voltage of the initialization power supply line is applied to the second counter electrode of the capacitor, in the write period of the data signal with respect to the capacitor, the first scanning control circuit sets the first scanning control line to be in a select state to turn on the write transistor, the second scanning control circuit sets the second scanning control line to be in a non-select state to turn off the initialization transistor, and the light emission control circuit sets the light emission control line to be in the non-select state to turn off the drive transistor, and the data signal is applied to the first counter electrode of the capacitor, and in a period from the write period to a light emission period, the first scanning control circuit maintains the first scanning control line in a non-select state to keep the write transistor off, the second scanning control circuit maintains the non-select state of the second scanning control line to keep the initialization transistor off, and the light emission control circuit sets the light emission control line to be in the select state to turn on the drive transistor.

2. The display device according to claim 1, further comprising:

a current measurement circuit, wherein, in a measurement mode in which a characteristic of the drive transistor is measured, in a write period of a measurement signal with respect to the capacitor, the first scanning control circuit sets the first scanning control line to be in a select state to turn on the write transistor, the second scanning control circuit sets the second scanning control line to be in a select state to turn on the initialization transistor, and the light emission control circuit sets the light emission control line to be in the select state to turn on the drive transistor to, and the measurement signal is applied to the first counter electrode of the capacitor, and in a measurement period for a characteristic of the drive transistor, the first scanning control circuit sets the first scanning control line to be in a non-select state to turn off the write transistor, the second scanning control circuit maintains the select state of the second scanning control line to keep the initialization transistor on, the light emission control circuit maintains the light emission control line in the select state to keep the drive transistor on, and the current measurement circuit measures a current passing through the drive transistor and flowing to the initialization power supply line.

3. The display device according to claim 1, further comprising:

a current measurement circuit, wherein, in a measurement mode in which a characteristic of the drive transistor is measured, in a write period of a measurement signal with respect to the capacitor, the first scanning control circuit sets the first scanning control line to be in a select state to turn on the write transistor, and the second scanning control circuit sets the second scanning control line to be in a select state to turn on the initialization transistor, and the measurement signal is applied to the first counter electrode of the capacitor, and in a measurement period for a characteristic of the drive transistor, the first scanning control circuit sets the first scanning control line to be in a non-select state to turn off the write transistor, the second scanning control circuit maintains the select state of the second scanning control line to keep the initialization transistor on, the light emission control circuit sets the light emission control line to be in the select state to turn on the drive transistor, and the current measurement circuit measures a current passing through the drive transistor and flowing to the initialization power supply line.

4. The display device according to claim 1, further comprising:

a current measurement circuit, wherein, in a measurement mode in which a characteristic of the light-emitting element is measured, in a write period of a measurement signal with respect to the capacitor, the first scanning control circuit sets the first scanning control line to be in a select state to turn on the write transistor, the second scanning control circuit sets the second scanning control line to be in a select state to turn on the initialization transistor, and the light emission control circuit sets the light emission control line to be in the select state to turn on the drive transistor, and the measurement signal is applied to the first counter electrode of the capacitor, and in a measurement period for a characteristic of the light-emitting element, the first scanning control circuit sets the first scanning control line to be in a non-select state to turn off the write transistor, the second scanning control circuit maintains the select state of the second scanning control line to keep the initialization transistor on, the light emission control circuit sets the light emission control line to be in the non-select state to keep the drive transistor off, and the current measurement circuit measures a current passing through the initialization power supply line and flowing to the light-emitting element.

5. The display device according to claim 4, wherein at least two or more voltages are input to the initialization power supply line in the measurement period for a characteristic of the light-emitting element.

6. The display device according to claim 4, wherein, in the measurement period for a characteristic of the light-emitting element, the voltage input to the initialization power supply line is a monotonically increasing or monotonically decreasing voltage.

7. A display device comprising:

in a display region, a first scanning control line, a light emission control line extending parallel to the first scanning control line, a data signal line intersecting the first scanning control line, a pixel circuit provided at an intersection of the first scanning control line and the data signal line, and a light-emitting element provided for each of the pixel circuits; and in a non-display region, a first scanning control circuit configured to drive the first scanning control line and a light emission control circuit configured to drive the light emission control line, wherein each of the pixel circuits includes a drive transistor, a write transistor, and a capacitor configured to hold a data signal, the drive transistor including a first control terminal and a second control terminal positioned above and below a semiconductor layer with the semiconductor layer interposed between the first and second control terminals, the drive transistor configured to cause a drive current to flow to the light-emitting element, the write transistor includes a first conduction terminal connected to the data signal line, a second conduction terminal connected to the first control terminal of the drive transistor, and a control terminal connected to the first scanning control line, the drive transistor includes the second control terminal connected to the light emission control line, the light emission control circuit outputs, to the light emission control line, a light emission control signal that switches between a select state in which the drive transistor is turned on and a non-select state in which the drive transistor is turned off, the display region includes an initialization power supply line and a second scanning control line extending parallel to the first scanning control line, and the non-display region includes a second scanning control circuit configured to drive the second scanning control line, the pixel circuit includes an initialization transistor, the initialization transistor including a first conduction terminal connected to the initialization power supply line, a second conduction terminal connected to a conduction terminal of the drive transistor on the light-emitting element side, and a control terminal connected to the second scanning control line, a first counter electrode of the capacitor is connected to the first control terminal of the drive transistor, and a second counter electrode of the capacitor is connected to the second conduction terminal of the initialization transistor, in a write period of the data signal with respect to the capacitor, the first scanning control circuit sets the first scanning control line to be in a select state to turn on the write transistor, the second scanning control circuit sets the second scanning control line to be in a select state to turn on the initialization transistor, and the light emission control circuit sets the light emission control line to be in the select state to turn on the drive transistor, and the data signal is applied to the first counter electrode of the capacitor and an initialization voltage of the initialization power supply line is applied to the second counter electrode, and in a period from the write period to a light emission period, the first scanning control circuit sets the first scanning control line to be in a non-select state to turn off the write transistor, the second scanning control circuit sets the second scanning control line to be in a non-select state to turn off the initialization transistor, and the light emission control circuit maintains the light emission control line in the select state to keep the drive transistor on.

8. A display device comprising:

in a display region, a first scanning control line, a light emission control line extending parallel to the first scanning control line, a data signal line intersecting the first scanning control line, a pixel circuit provided at an intersection of the first scanning control line and the data signal line, and a light-emitting element provided for each of the pixel circuits; and in a non-display region, a first scanning control circuit configured to drive the first scanning control line and a light emission control circuit configured to drive the light emission control line, wherein each of the pixel circuits includes a drive transistor, a write transistor, and a capacitor configured to hold a data signal, the drive transistor including a first control terminal and a second control terminal positioned above and below a semiconductor layer with the semiconductor layer interposed between the first and second control terminals, the drive transistor configured to cause a drive current to flow to the light-emitting element, the write transistor includes a first conduction terminal connected to the data signal line, a second conduction terminal connected to the first control terminal of the drive transistor, and a control terminal connected to the first scanning control line, the drive transistor includes the second control terminal connected to the light emission control line, the light emission control circuit outputs, to the light emission control line, a light emission control signal that switches between a select state in which the drive transistor is turned on and a non-select state in which the drive transistor is turned off, the display region includes an initialization power supply line and a second scanning control line extending parallel to the first scanning control line, and the non-display region includes a second scanning control circuit configured to drive the second scanning control line, the pixel circuit includes an initialization transistor, the initialization transistor including a first conduction terminal connected to the initialization power supply line, a second conduction terminal connected to a conduction terminal of the drive transistor on the light-emitting element side, and a control terminal connected to the second scanning control line, a first counter electrode of the capacitor is connected to the first control terminal of the drive transistor, and a second counter electrode of the capacitor is connected to the second conduction terminal of the initialization transistor, in a write period of the data signal with respect to the capacitor, the first scanning control circuit sets the first scanning control line to be in a select state to turn on the write transistor, the second scanning control circuit sets the second scanning control line to be in a select state to turn on the initialization transistor, and the light emission control circuit sets the light emission control line to be in the non-select state to turn off the drive transistor, and the data signal is applied to the first counter electrode of the capacitor and an initialization voltage of the initialization power supply line is applied to the second counter electrode, and in a period from the write period to a light emission period, the first scanning control circuit sets the first scanning control line to be in a non-select state to turn off the write transistor, the second scanning control circuit sets the second scanning control line to be in a non-select state to turn off the initialization transistor, and the light emission control circuit maintains the light emission control line in the select state to keep the drive transistor on.

9. The display device according to claim 8, further comprising:

a current measurement circuit, wherein, in a measurement mode in which a characteristic of the drive transistor is measured, in a write period of a measurement signal with respect to the capacitor, the first scanning control circuit sets the first scanning control line to be in a select state to turn on the write transistor, the second scanning control circuit sets the second scanning control line to be in a select state to turn on the initialization transistor, and the light emission control circuit sets the light emission control line to be in the select state to turn on the drive transistor to, and the measurement signal is applied to the first counter electrode of the capacitor, and in a measurement period for a characteristic of the drive transistor, the first scanning control circuit sets the first scanning control line to be in a non-select state to turn off the write transistor, the second scanning control circuit maintains the select state of the second scanning control line to keep the initialization transistor on, the light emission control circuit maintains the light emission control line in the select state to keep the drive transistor on, and the current measurement circuit measures a current passing through the drive transistor and flowing to the initialization power supply line.

10. The display device according to claim 8, further comprising:

a current measurement circuit, wherein, in a measurement mode in which a characteristic of the drive transistor is measured, in a write period of a measurement signal with respect to the capacitor, the first scanning control circuit sets the first scanning control line to be in a select state to turn on the write transistor, and the second scanning control circuit sets the second scanning control line to be in a select state to turn on the initialization transistor, and the measurement signal is applied to the first counter electrode of the capacitor, and in a measurement period for a characteristic of the drive transistor, the first scanning control circuit sets the first scanning control line to be in a non-select state to turn off the write transistor, the second scanning control circuit maintains the select state of the second scanning control line to keep the initialization transistor on, the light emission control circuit sets the light emission control line to be in the select state to turn on the drive transistor, and the current measurement circuit measures a current passing through the drive transistor and flowing to the initialization power supply line.

11. The display device according to claim 8, further comprising:

a current measurement circuit, wherein, in a measurement mode in which a characteristic of the light-emitting element is measured, in a write period of a measurement signal with respect to the capacitor, the first scanning control circuit sets the first scanning control line to be in a select state to turn on the write transistor, the second scanning control circuit sets the second scanning control line to be in a select state to turn on the initialization transistor, and the light emission control circuit sets the light emission control line to be in the select state to turn on the drive transistor, and the measurement signal is applied to the first counter electrode of the capacitor, and in a measurement period for a characteristic of the light-emitting element, the first scanning control circuit sets the first scanning control line to be in a non-select state to turn off the write transistor, the second scanning control circuit maintains the select state of the second scanning control line to keep the initialization transistor on, the light emission control circuit sets the light emission control line to be in the non-select state to keep the drive transistor off, and the current measurement circuit measures a current passing through the initialization power supply line and flowing to the light-emitting element.

12. The display device according to claim 11, wherein at least two or more voltages are input to the initialization power supply line in the measurement period for a characteristic of the light-emitting element.

13. The display device according to claim 11, wherein, in the measurement period for a characteristic of the light-emitting element, the voltage input to the initialization power supply line is a monotonically increasing or monotonically decreasing voltage.

* * * * *